May 20, 1952          H. SEELER          2,597,039
PRESSURE BREATHING DEMAND OXYGEN REGULATOR
Filed Aug. 19, 1949          2 SHEETS—SHEET 1
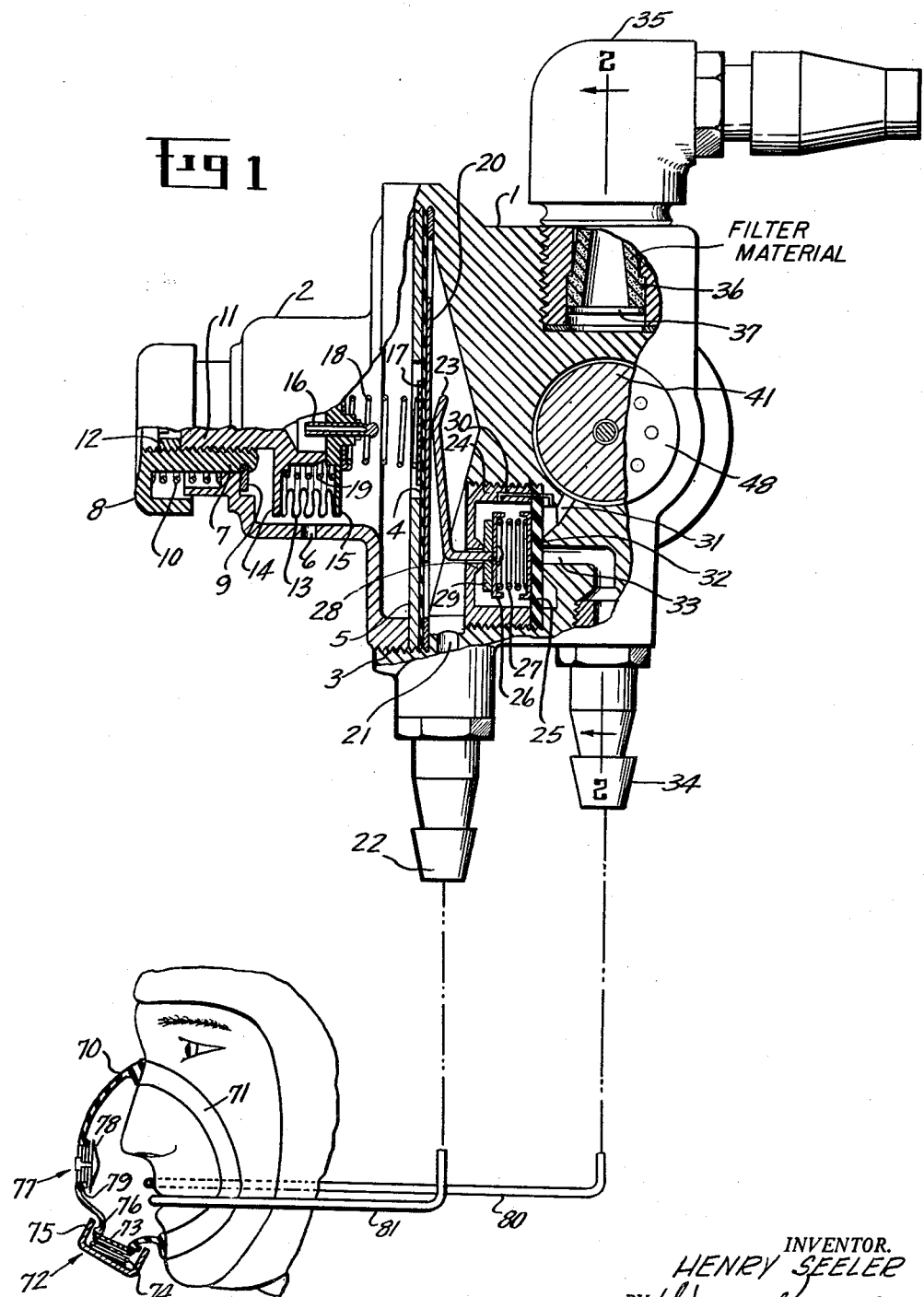
INVENTOR.
HENRY SEELER
BY Wade Koontz
ATTORNEY and
Charles L. Burgoyne
AGENT May 20, 1952 H. SEELER 2,597,039
PRESSURE BREATHING DEMAND OXYGEN REGULATOR
Filed Aug. 19, 1949 2 SHEETS—SHEET 2
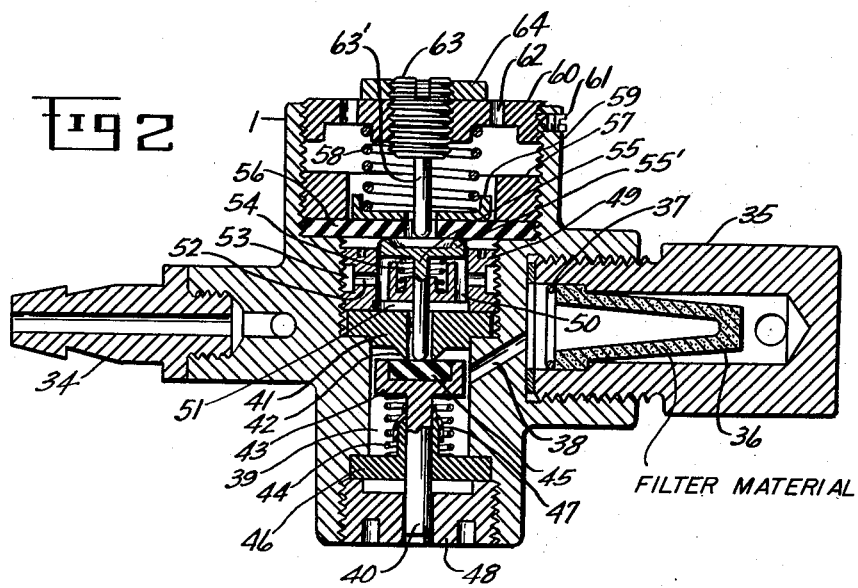
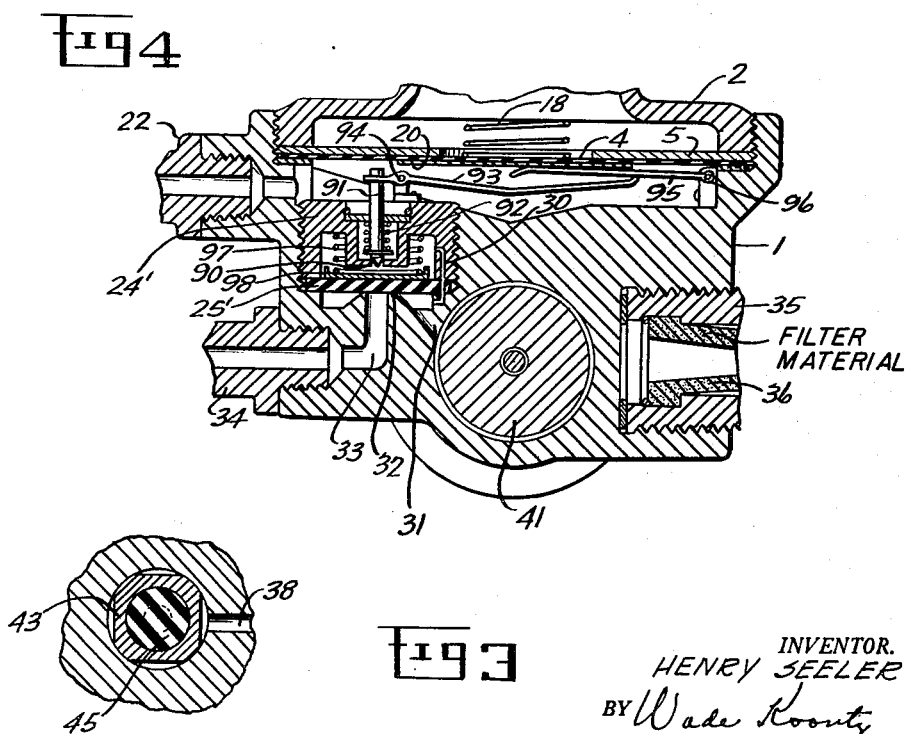
INVENTOR.
HENRY SEELER Patented May 20, 1952

2,597,039

UNITED STATES PATENT OFFICE 2,597,039

PRESSURE BREATHING DEMAND OXYGEN REGULATOR

Henry Seeler, Dayton, Ohio

Application August 19, 1949, Serial No. 111,293

4 Claims. (Cl. 128—142)

(Granted under the act of March 3, 1883, as amended April 30, 1928; 370 O. G. 757)

The invention described herein may be manufactured and used by or for the United States Government for governmental purposes without payment to me of any royalty thereon.

The present invention relates to a pressure breathing demand oxygen regulator, particularly for use with an aviator's high-altitude oxygen mask.

The primary object of the invention is to provide an oxygen demand regulator including an efficient pressure reducing valve, a separate oxygen supply valve and a pilot valve responsive to variations in pressure during the breathing cycle to cause actuation of the oxygen supply valve.

A further object of the invention is to provide an oxygen demand regulator of general application in oxygen demand systems and characterized by a control diaphragm subject to atmospheric pressure on one side and to breathing pressure on the other side, whereby the diaphragm may act through a secondary or pilot valve to effect operation of a primary or supply valve to permit oxygen flow to a subject when he inhales and to cut off such oxygen flow when he exhales.

Another object of the invention is to provide an oxygen demand regulator for use at high altitudes and including means responsive to the decreased atmospheric presures at high altitudes to increase the flow of oxygen to the subject relying on the regulator to supply oxygen.

Another object of the invention is to provide an oxygen demand regulator including an oxygen supply valve in the form of a diaphragm covering one end of a pilot valve chamber normally filled with oxygen at the same pressure as exists on the side of the diaphragm facing away from the chamber, and wherein a pilot valve is adapted to open said chamber and reduce the pressure therein to simultaneously cause opening of the oxygen supply valve by the pressure exerted on the side thereof facing away from the pilot valve chamber.

Another object of the invention is to provide an oxygen demand regulator including a pressure reducing valve and further including in association therewith a safety valve to release excessive oxygen presure which might build up in the low pressure valve chamber due to faulty action of the reducing valve.

Another object of the invention is to provide an oxygen demand regulator of general application in oxygen demand systems and characterized by a control diaphragm subject to atmospheric pressure on one side and to breathing pressure on the other side and further characterized by the addition of a manually controlled pressure device to increase the pressure exerted on the atmospheric pressure side of the diaphragm.

The above and other objects of the invention will become apparent upon reading the following detailed description in conjunction with the accompanying drawings, in which:

Fig. 1 is an elevation view partly in cross section showing one form of oxygen regulator and its connection with respect to a face mask.

Fig. 2 is a cross sectional view taken on the line 2—2 of Fig. 1.

Fig. 3 is a cross sectional view through the oxygen pressure reducing valve of Fig. 2 to show its preferred cross sectional shape.

Fig. 4 is a cross sectional view showing a modified form of pilot valve.

In oxygen demand breathing systems there is usually provided some means to regulate or meter the flow of oxygen to the breathing mask or apparatus. If the regulator is made responsive to periodic reduction of pressure inside the mask then it may be made to increase the flow of oxygen in accordance with the reduced mask pressure and thus supply oxygen when there is a demand for it. This type of control system results in conservation of the oxygen supply and also insures a minimum of discomfort and effort during breathing. Such a system, including also means to utilize air as well as oxygen for breathing, is disclosed and claimed in my copending application Serial No. 50,343, filed September 21, 1948, and entitled "Oxygen Demand Breathing System Including Means For Altitude Regulation," now Patent 2,552,595 issued May 15, 1951. The uses and functions of the present regulator will be explained as the description proceeds but the constructional features of the regulator will be stressed especially.

The regulator of Figs. 1, 2 and 3, which is illustrated on an enlarged scale, includes a generally circular housing made up of a main housing element 1 and a secondary housing element 2, the latter threading into the former as at 3. An internal shoulder of the main housing element receives a thin flexible diaphragm 4 and also a flat protective ring 5 to prevent the diaphragm from bulging toward the left in Fig. 1, these parts being clamped in place by means of the housing element 2. The diaphragm may be made of a high-strength rubberized textile fabric about 0.015 of an inch thick. The diaphragm divides the interior of the housing into an aneroid chamber to the left (Fig. 1) and a control chamber to the right. The aneroid chamber is open to the atmosphere by means of a plurality of holes 6 and at its outer end the housing element 2 is centrally apertured to slidably receive a plunger 7 having a knob-like formation 8 on its outer end. To prevent removal of the plunger the inner end is grooved and fitted with a snap-ring or washer 9. Between the knob 8 and the outer end of housing element 2 there is a compression spring 10 tending at all times to hold the plunger in the outer position as shown. In a central threaded bore in the plunger 7 is secured an aneroid carrying member 11 locked in place by a lock screw 12. The aneroid bellows includes the usual flexible sleeve 13 having one end secured to a flange 14 of member 11 and the other end secured to a disk 15 having a central sealing tube 16 fastened therethrough. Extending between the disk 15 and a pressure plate 17 secured to the diaphragm is a light compression spring 18, the latter being capable of exerting more or less pressure on the diaphragm according to the expansion or contraction of the aneroid bellows. Furthermore by pressing in the plunger 7 the pressure on the diaphragm may be increased considerably at any time to actuate the pilot or control valve in an emergency and obtain an immediate flow of oxygen if oxygen is still available. The plunger might also be pushed in and held in if it appeared that the aneroid bellows had ceased to function. The bellows has a compression spring 19 enclosed therewithin to cause expansion thereof as altitude increases. This type of bellows is sealed up while in a partial vacuum and at sea level pressures will be compressed a maximum amount. As pressure is reduced with increase in altitude, the bellows will expand proportionately. The coil spring 19 acts to overcome bending resistance of the bellows walls, thus making the bellows more responsive or sensitive.

The side of diaphragm 4 facing the control chamber has adhered thereto a thin plate or disk 20 of any suitable material having a diameter greater than that of the central aperture in ring 5. Opening into the control chamber is a control passage 21 extending outwardly through a hose coupling member 22. Bearing on the disk 20 is one end of a pilot valve control lever 23 extending into the pilot valve housing 24. The latter of cylindrical form is screw threaded into the main housing element 1 and serves to securely clamp a heavy flexible diaphragm 25 in place as shown. Mounted on lever 23 within housing 24 is a disk 26 having a coil spring 27 bearing thereon and seated also on a similar disk engaging the diaphragm 25. The wall of housing 24 includes a valve seat 28 on which bears a valve member 29, adapted to rock with the lever 23 extending loosely through a central aperture in the end wall of housing 24. When pressure is exerted on the free end of lever 23 by the diaphragm 4, the valve member 29 by its contact with the lower edge of valve seat 28 provides a lever fulcrum whereby the lever and valve member rock together and unseat the valve member from the valve seat. The spring 27 restores the valve member to its seated position when pressure on the free end of lever 23 is relieved. Normally there is oxygen pressure in the housing 24 because of the thin passage 30 extending to the oxygen supply passage 31. However upon opening of the pilot valve or secondary valve 28—29, the pressure in the housing 24 falls rapidly and the pressure in passage 31 and in the annular space connected thereto causes the diaphragm 25 to leave the valve seat 32. Now the oxygen may flow into the central passage 33 and thence out through tube fitting 34 to the face mask.

Considering now the cross sectional view in Fig. 2 it is noted that oxygen under high pressure is supplied to a fitting 35, the latter being adapted to be plugged into an oxygen pressure main having at least one special self-closing aperture therein. The oxygen under pressure flows through a porous filter element 36 held in place within the fitting 35 by a snap ring 37, the filter acting to screen out dust particles. The filtered oxygen passes on through the bore 38 to the high pressure chamber 39 of a pressure reducing valve made up principally of a spring-projected plunger 40 and a fixed valve member 41, including a circular valve seat 42 having an inside diameter equal to the diameter of plunger 40. The head of the plunger 40 comprises an enlargement 43 serving as an abutment for a coil spring 44 and the enlargement also carries a circular insert 45 of plastic or fiber to engage the circular valve seat 42. The coil spring 44 also abuts the stationary member 46, which serves as a guide for the plunger 40. The member 46 includes a tubular extension carrying a rubber sleeve 47 to prevent gas leakage between plunger 40 and the guide therefor. The stationary member 46 is held in place as shown by a threaded plug 48.

The reducing valve seat member 41 is held in place within the chamber 39 by means of threaded member 49 having several longitudinal bores 50 opening into a recess 51 and communicating with transverse bores 52 extending to an annular recess 53. The recess 53 communicates with the oxygen supply valve including diaphragm 25 by way of a sloping passage 31 described above in conjunction with Fig. 1. The central portion of member 49 is annularly recessed to receive a coil spring 54 for biasing a valve push rod 55 in a direction away from the plunger 40. One end of rod 55 is adapted to contact plunger 40 by way of the opening in valve seat 42. The other end of rod 55 is enlarged to provide safety valve means in cooperation with a centrally-pierced diaphragm 56 of a resilient material such as heavy rubberized fabric. The diaphragm 56 is secured in place along its outer marginal edge by means of a threaded ring 57 and is constantly biased inwardly by a coil spring 58 seated on a disk or washer 59 centered on the diaphragm 56. The outer end of spring 58 bears on a threaded cover member 60 locked in adjusted position by a set screw 61. Thus by proper setting of the cover member the compression of spring 58 may be adjusted to regulate the position of diaphragm 56 and push rod 55. The cover member 60 is pierced at several points, as at 62, for reasons to be explained below. Adjustably threaded into the center of cover member 60 is a safety valve actuating pin 63 having the inner reduced end portion 63' extending centrally through washer 59 and diaphragm 56. The pin 63 is secured against movement by a lock nut 64.

Attention is now directed to Fig. 3 which shows a fragmentary cross sectional view through the pressure reducing valve at the enlarged end 43 of the plunger 40. As seen in Fig. 3 this head portion of the plunger is provided with flat sides to allow oxygen to flow into the space around the reducing valve 42, 43. Without describing the complete operation of the present automatic oxygen regulator it will be noted how the safety valve including diaphragm 56 and the enlarged head of push rod 55 functions. This head portion has a raised rim 55' of relatively large diameter normally held in tight contact with diaphragm 56 by oxygen pressure in the space below or inwardly of the diaphragm. However if the reducing valve 42, 43 should not seat properly or if dirt should hold it open slightly at times when it should be closed, the oxygen pressure will build up higher than normally in the space around the push rod 55. This will bulge the diaphragm 56 outwardly and the head of push rod 55 will follow the bulging diaphragm until it meets the free end of reduced pin portion 63'. Any further pressure rise will push diaphragm 56 still farther outwardly but the rod 55 can not move any farther and there will now be a separation between the rim 55' and diaphragm 56 thus venting the excess pressure to the outside by way of the ports 62 in cover member 60. This action will keep to an allowable maximum the oxygen pressure in the recess 53 and connecting passage 31 leading to the oxygen supply valve shown in Fig. 1. The safety valve arrangement is simple and compact, the enlarged end of push rod 55 bearing directly on the pressure sensitive diaphragm 56 to form a reliable valve having a minimum of parts. The maximum pressure value can be varied by proper setting of the safety valve actuating pin 63. By using as few working parts as possible greater dependability is obtained and manufacture of the regulator is facilitated.

For a complete description of the regulator operation reference will first be made to Fig. 1 wherein there is shown a preferred type of face mask 70 to be worn by the subject and retained on the face in any convenient manner. The mask covers the wearer's nose and mouth and does not allow gas to escape in any appreciable amount around the peripheral contacting portion 71. At the lower side of the mask there is a pressure relief valve or outlet valve 72 which includes a housing 75 inclosing a disk valve 73 and coil spring 74. The disk valve 73 normally seats on an annular valve seat 76 but when the subject exhales, the mask pressure is increased to such an extent that the valve 73 opens momentarily and allows escape of exhaled air and products of respiration. On the forward wall of the mask there may be provided a suction valve or air inlet valve 77, which includes a flapper element 78 of soft rubber held in place by arms secured to the mask wall. Inside the mask there is a valve seat 79 against which the marginal edges of the flapper element may engage to close the air inlet valve. Thus the valve 77 is normally closed but when the gas pressure inside the mask is negative or below atmosphere, as it is during inhalation phases of the breathing cycle, the small difference in pressure causes the flapper element 78 to leave the valve seat 79 and allows outside air to enter the mask as a supplement or extender for the oxygen reaching the mask. In the drawing (Fig. 1) the air inlet or inhalation valve 77 is open and the outlet or exhalation valve 72 is closed. Thus at the instant depicted the subject is inhaling and is drawing air from the free atmosphere as well as oxygen from the supply tube 80. The latter tube as well as a control tube 81 extend some distance to the automatic regulator. The latter device is shown in Fig. 1 in its normal relative position, that is with the special quick-disconnect fitting 35 projecting horizontally for support by and connection with an oxygen main built on the wall of the aircraft. The mask structure is of course shown on a reduced scale, while the regulator is drawn to an enlarged scale. With the regulator well supported in the position shown, the subject may push in on the button or knob 8 at any time he is not getting proper oxygen supply and the extra pressure on spring 18 will certainly actuate the pilot valve lever 23, thus making certain that the pilot valve is not stuck at least.

Now considering the regulator and mask in connected relation with a supply of high pressure oxygen, say about 400 pounds per square inch, connected to the fitting 35 the subject may inhale thus causing the inlet valve 77 on the mask to open if he is at lower altitudes where outside pressure is relatively high. At the same time the lowered mask pressure during inhalation will lower the pressure in the control tube 81 and in the space to the right of control diaphragm 4. Since there is atmospheric pressure on the opposite side of the diaphragm as well as the pressure of spring 18, the diaphragm 4 will now move to the right and actuate the pilot valve 28, 29. Oxygen pressure in the housing 24 built up by way of their passage 30 will now be lost suddenly and the pressure of oxygen on the right side of oxygen supply diaphragm 25 will push the diahpragm away from supply valve seat 32, to allow oxygen to rush into passage 33 and by way of tube 80 into the mask 70. In a reverse manner, the subject may now exhale to close the inlet valve 77 and open the exhalation valve 72. At the same time the pressure increase in the control tube 81 and in the space to the right of diaphragm 4 will remove any actuating pressure from pilot valve lever 23, thus allowing the pilot valve 28, 29 to close under action of the spring 27. Now the pressure in housing 24 again increases by reason of the narrow passage 30 and becomes equal to that in the oxygen inlet 31 extending from the pressure reducing valve. Now the diaphragm valve 25 will be closed by the spring 27 and also because the increased area on the housing side of diaphragm 25 will result in a greater total pressure on this side compared with the total pressure on the side nearest inlet 31. As the altitude increases and the aneroid bellows 13 expands, the pressure exerted by coil spring 18 will increase. Therefore the pilot valve lever 23 will be actuated more readily upon inhalation and will stay open longer due to the greater force exerted by the spring 18. Because of the apertures 6 there will always be atmospheric pressure in the aneroid chamber to the left of control diaphragm 4. At extreme altitudes the aneroid bellows will be expanded to such an extent that the pressure of spring 18 on the diaphragm 4 will retain the pilot valve open almost continuously. Thus the supply valve 25, 32 will be held open and oxygen will flow from passage 31 into outlet 33 and thence by supply tube 80 to the face mask 70. Even at high altitudes, say above 25,000 feet, there will be short periods during exhalation when the pressure on the right side of diaphragm 4 will increase sufficiently to overcome the pressure of spring 18 and allow pilot valve 28, 29 to close. Thus even under extreme altitude conditions there may be times when the supply valve 25, 32 closes momentarily. These times are of course only when there is no demand for oxygen and when the exhalation pressure reaches a maximum. Initial regulation or adjustment of the diaphragm actuating spring 18 may be accomplished by rotation of the member 11 threaded into knob 8. As previously noted the knob 8 enables the person relying on the regulator to exert considerably increased pressure on the spring 18, thus actuating the pilot valve 28, 29 manually if it should appear that the valve is sticking or failing to operate because of other difficulties, such as a break in the control diaphragm 4.

The oxygen under pressure flows to passage 31 from the reducing valve shown in detail in Fig. 2 and housed within a cylindrical space of varying diameter, the axis of which is at a right angle to the axis of the aneroid chamber. The action of the pressure reducing valve is due to the balancing action of the adjustable spring 58 and the oxygen pressure exerted on opposite sides of the diaphragm 56. The diaphragm is adapted to actuate the reducing valve 42, 43 by movement of the push rod 55. By proper selection of the spring 58 and proper sizing of the diaphragm 56, the forces on the diaphragm are made to position the diaphragm and the push rod in a position to close the reducing valve when the pressure around the push rod and in the passages 51 to 53 is at the desired level, for example 50 pounds per square inch. Thus even though the oxygen pressure in the chamber 39 is very high, perhaps as great as 500 pounds per square inch, the pressure of oxygen reaching the passage 31 will be held at a reduced level by the automatic action of the reducing valve. Considering the oxygen supply valve 25, 32 as closed the reduced pressure will prevail in the passage 31 and the reducing valve 42, 43 will be closed tightly and the parts will all be in the positions shown in Figs. 1 and 2. Now if there is a demand for oxygen, as upon inhalation by the person wearing mask 70, the pilot valve 28, 29 will be opened, the supply valve 25, 32 will be opened and the pressure in pasage 31 will suddenly drop as oxygen flows into the supply tube 80. The reduction in pressure within the space adjacent to the diaphragm 56 (Fig. 2) will now destroy the balanced condition of the opposing forces thereon, and the spring 58 will move the diaphragm 56, the push rod 55 and the valve member 43 away from the cover plate 60 at one end of the spring. High pressure oxygen in chamber 39 will now flow past valve 42, 43 until it restores the previous balanced condition of diaphragm 56 at which time the push rod 55 will have moved to a position permitting the valve 42, 43 to again close. This intermittent action of the reducing valve 42, 43 will occur regularly during normal breathing of the person wearing mask 70, since each inhalation will usualy draw enough oxygen to reduce the pressure in the space adjacent to diaphragm 56 sufficiently to cause some opening of valve 42, 43 and thus restore the desired pressure in the passage 31. All movements of the diaphragm 56 are followed by the push rod 55, since oxygen pressure maintains the enlarged head of the rod tightly against the diaphragm with the elevated rim 55' effectively sealing off the central opening in the diaphram from oxygen pressure.

As noted above, there is provision made for prevention of high pressure conditions in the passage 31 leading to the oxygen supply valve 25, 32. This is the safety valve formed by the pierced diaphragm 56 and the enlarged head of push rod 55. Assuming that the reducing valve 42, 43 failed to seat properly after the push rod had moved to the position illustrated, where it is just barely touching the central valve portion 45, then the high pressure oxygen in chamber 39 will continue flowing into the space 51, passages 50 and the space adjacent to diaphragm 56. This will continue only long enough to force the diaphragm and the push rod into positions where the push pin 63 may contact the center of push rod 55 and break the normal sealing action of the rod on the pierced diaphragm. Now oxygen will flow past the elevated rim 55' on the push rod head, out through the central aperture of diaphragm 56 and thence to the atmosphere by way of apertures 62. Thus the pressure relief or safety valve of simple design and adjustable action will effectively prevent development of excessive pressures in the oxygen supply system and in the face mask. It is noted that the push rod 55 normally follows the diaphragm because of oxygen pressure thereon, as well as because of the spring 54. The reducing valve construction including the above mentioned safety feature forms the subject matter of my copending application Serial No. 231,645 filed June 14, 1951.

It is noted that the diameter of plunger 40 is equal to the diameter of the hole through the valve member 41 in order to prevent unequal endwise pressures on the enlarged head 43 of the plunger 40. The endwise pressures on opposite sides of this head exerted by high pressure in chamber 39 will thus balance and response of the plunger to the movement of push rod 55 will be determined solely by the strength of the coil spring 44. If this were not so constructed the operation of the reducing valve would be unreliable and the plunger would probably chatter. Also as the primary oxygen pressure was reduced by consumption of the gas, the effect on the reducing valve would be changed and the reducing valve action would not be the same as with the original high pressure. This balancing action resulting from making the diameter of the rod 40 equal to the diameter of the valve seat is very important to the proper functioning of the pressure reducing valve.

One modification of the present invention is illustrated in Fig. 4 and involves only a change in the pilot valve structure. As in Fig. 1 the regulator body 1 has mounted therein a cylindrical housing designated 24' and adapted to retain a flexible diaphragm 25' in position against a circular shoulder. The diaphragm forms an oxygen supply valve in cooperation with the valve seat 32, which when opened allows oxygen to flow from the passage 31 into the oxygen outlet 33 leading to the fitting 34. The wall of the housing 24' opposite to the diaphragm is formed inwardly and provided with a valve seat 90 on which seats a cone-tip poppet valve member 91. The valve member 91 is biased toward closed position by a light coil spring 92, and is adapted for actuation to open position by means of a lever 93 pivoted at 94 and another lever 95 pivoted at 96. The free end of the second lever bears on one side of a disk 20 secured to the control diaphragm 4, and outward bulging of the thin diaphragm 4 is prevented by a fixed ring 5 clamped in place with the diaphragm by the cover member 2 inclosing the aneroid bellows. Also it is noted that the valve diaphragm 25' is biased to valve closing position by a coil spring 97 contacting a disk 98 on the diaphragm.

The operation of the modified pilot valve and its effect on the regulator is like that already described. When the control diaphragm 4 senses a reduced pressure in the face mask by reason of the control tube attached to fitting 22, the diaphragm bulges inwardly by the action of spring 18. This actuates levers 95 and 93 in a manner to move the poppet 91 away from valve seat 90. The pressure in housing 24' now drops rapidly and allows the oxygen pressure on the other side of diaphragm 25' to move the diaphragm away from valve seat 32. The oxygen from inlet 31 may now flow over into outlet 33 to reach the face mask. An increase in pressure on the diaphragm 4, as during exhalation, causes the diaphragm to move back against the ring or plate 5 thus allowing the pilot valve member 91 to close against valve seat 90. Now the pressure in the housing 24' will build up by way of passage 30 and the diaphragm 25' will be forced back to the seated position by means of the coil spring 97.

The second form of pilot valve is sometimes preferred in spite of its more complex construction, because it is more reliable when properly constructed and adjusted. It is also noted that the poppet member 91 passes through a small guide plate which may be pierced at several points to allow free escape of oxygen upon opening of the pilot valve.

The embodiments of the invention herein shown and described are to be regarded as illustrative only and it is to be understood that the invention is susceptible of variations, modifications and changes within the scope of the appended claims.

I claim:

1. A breathing demand oxygen regulator for operative association with a face mask and a container of oxygen under pressure, said regulator comprising a differential pressure responsive means adapted for actuation by the fluid pressure inside the face mask acting in opposition to atmospheric pressure, a pilot valve chamber including a pilot valve passage and concentric pilot valve seat in one wall thereof, a movable pilot valve assembly including a disk valve element inside said pilot valve chamber and spring-pressed onto said pilot valve seat and further including an actuating lever rigidly connected to said disk valve element and extending through said pilot valve passage for actuation by said differential pressure responsive means to open said pilot valve passage upon decrease of said mask pressure, a flexible diaphragm forming one wall of said pilot valve chamber, means providing a passage of predetermined caliber from the oxygen supply container into said pilot valve chamber, an annular oxygen supply valve seat adapted for cooperation with said flexible diaphragm to provide an oxygen supply valve, means providing an annular chamber around said oxygen supply valve seat in communication with the oxygen supply container, and means for conducting oxygen passing by said oxygen supply valve to the face mask.

2. A breathing demand oxygen regulator for operative association with a face mask and a container of oxygen under pressure, said regulator comprising a differential pressure responsive means adapted for actuation by the fluid pressure inside the face mask acting in opposition to atmospheric pressure, means including an aneroid bellows and a compression spring for augmenting the atmospheric pressure and producing an additional pressure proportional to the altitude above sea level, an exteriorly situated push button connected to one end of said aneroid bellows for manual application of further pressure to augment said atmospheric pressure in an emergency, a pilot valve chamber including a pilot valve passage and pilot valve seat in one wall thereof, a movable pilot valve assembly including a valve element spring-pressed onto said pilot valve seat and an actuating lever movable by said differential pressure responsive means to open said pilot valve passage upon decrease of said mask pressure, a flexible diaphragm forming one wall of said pilot valve chamber, means providing a passage of predetermined caliber from the oxygen supply container into said pilot valve chamber, an annular oxygen supply valve seat adapted for cooperation with said flexible diaphragm to provide an oxygen supply valve, means providing an annular chamber around said oxygen supply valve seat in communication with the oxygen supply container, and means for conducting oxygen passing by said oxygen supply valve seat to the face mask.

3. A breathing demand oxygen regulator for operative association with a face mask and a container of oxygen under pressure, said regulator comprising a differential pressure responsive means adapted for actuation by the fluid pressure inside said face mask acting in opposition to atmospheric pressure, a cylindrical pilot valve housing including a pilot valve passage and concentric pilot valve seat in one end wall thereof, a pilot valve assembly including a movable valve element spring-pressed onto said pilot valve seat and a valve element actuating lever movable by said differential pressure responsive means to open said pilot valve passage upon decrease of said mask pressure, a flexible diaphragm forming the other end wall of said pilot valve housing, an annular oxygen supply valve seat adapted for cooperation with said flexible diaphragm to provide an oxygen supply valve, a coil spring within said pilot valve housing and having one end bearing on said flexible diaphragm to bias the diaphragm toward supply valve closing position, means providing an annular chamber around said oxygen supply valve seat in communication with the oxygen supply container, means providing a passage of predetermined caliber from said annular chamber into said pilot valve housing with a portion of said passage extending through the cylindrical side wall of said housing, and means for conducting oxygen passing by said oxygen supply valve seat to the face mask.

4. A breathing demand oxygen regulator for operative association with a free mask and a container of oxygen under pressure, said regulator comprising a differential pressure responsive means adapted for actuation by the fluid pressure inside the face mask acting in opposition to atmospheric pressure, a cylindrical pilot valve housing including a pilot valve passage and concentric pilot valve seat in one end wall of said housing, a movable pilot valve assembly including a disk valve element inside said pilot valve housing and further including an actuating lever rigidly connected to said disk valve element and extending through said pilot valve passage for actuation by said differential pressure responsive means to open said pilot valve passage upon decrease of said mask pressure, a flexible diaphragm forming the other end wall of said pilot valve housing, an annular oxygen supply valve seat adapted for cooperation with said flexible diaphragm to provide an oxygen supply valve, a compression coil spring in said pilot valve housing extending between said disk valve element and said flexible diaphragm to bias the pilot valve and supply valve toward closed position, means providing an annular chamber around said oxygen supply valve seat in communication with the oxygen supply container, means providing a passage of predetermined caliber from said annular chamber into said pilot valve housing, and means for conducting oxygen passing by said oxygen supply valve seat to the face mask.

HENRY SEELER.

REFERENCES CITED

The following references are of record in the file of this patent:

UNITED STATES PATENTS

| Number | Name | Date |
| --- | --- | --- |
| 2,252,152 | Worls | Aug. 12, 1941 |
| 2,257,204 | Temple | Sept. 30, 1941 |
| 2,384,669 | Fields | Sept. 11, 1945 |
| 2,441,216 | Wiggins | Jan. 25, 1946 |